(12) United States Patent
Luboshitz et al.

(10) Patent No.: US 8,725,807 B2
(45) Date of Patent: May 13, 2014

(54) DECENTRALIZED DATA CASTING IN AN INTEREST AWARE PEER NETWORK

(75) Inventors: Eli Luboshitz, Timrat (IL); Roei Melamed, Haifa (IL); Yoav Tock, Nesher (IL)

(73) Assignee: International Business Machines Corporation, Armonk, NY (US)

( * ) Notice: Subject to any disclaimer, the term of this patent is extended or adjusted under 35 U.S.C. 154(b) by 880 days.

(21) Appl. No.: 12/849,872

(22) Filed: Aug. 4, 2010

(65) Prior Publication Data

US 2012/0036187 A1   Feb. 9, 2012

(51) Int. Cl.
*G06F 15/16* (2006.01)

(52) U.S. Cl.
USPC .......................................... 709/204; 709/226

(58) Field of Classification Search
USPC ................................................ 709/204, 226
See application file for complete search history.

(56) References Cited

U.S. PATENT DOCUMENTS

| | | | |
|---|---|---|---|
| 6,349,340 B1 | 2/2002 | Dyer et al. | |
| 6,597,818 B2 | 7/2003 | Kumar et al. | |
| 7,607,007 B2 | 10/2009 | Stanford-Clark et al. | |
| 2007/0027591 A1 | 2/2007 | Goldenberg et al. | |
| 2008/0240616 A1 | 10/2008 | Haering et al. | |
| 2009/0087029 A1 | 4/2009 | Coleman et al. | |
| 2010/0027442 A1 | 2/2010 | Chockler et al. | |
| 2010/0211595 A1* | 8/2010 | Yamamoto et al. | 707/769 |
| 2011/0047142 A1* | 2/2011 | Raichur et al. | 707/711 |

OTHER PUBLICATIONS

El-Sayed et al., "A survey of proposals for an alternative group communication service", IEEE Network, vol. 17, Iss. 1, Jan.-Feb., p. 46 51, 2003.
P. T. Eugster et al., "The many faces of publish/subscribe". ACM Computing Surveys, 35(2):114-131, 2003.
Yoav Tock et al., "Hierarchical clustering of message flows in a multicast data dissemination system", Proc. 17th IASTED Int'l Conf. Parallel and Distributed Computing and Systems, p. 320-327, 2005.
M. Castro et al., "SCRIBE: a large-scale and decentralized application-level multicast infrastructure". IEEE J. Selected Areas in Comm. (JSAC), 20(8):148+1499, 2002.
M. Castro et al., "SCRIBE: a large-scale and decentralized application-level multicast infrastructure". IEEE J. Selected Areas in Comm. (JSAC), 20(8):1489-1499, 2002.

(Continued)

*Primary Examiner* — Tauqir Hussain
*Assistant Examiner* — Ebrahim Golabbakhsh
(74) *Attorney, Agent, or Firm* — F. Jason Far-hadian, Esq.; Century IP Group

(57) ABSTRACT

Systems and methods for data casting in an interest aware peer network are provided. The method comprises determining whether a set of interests associated with a node in a network is updated, wherein the set of interests comprises one or more topics IDs, wherein each topic ID corresponds to a topic of interest associated with said node; distributing the set of interests associated with the node to one or more neighboring nodes by way of a first distribution scheme until N nodes in the network are aware of the updated set of interests for the node; providing each node in the network with a mechanism to determine value of a topic of interest in a set of interests received in association with a node based on a topic ID included in the set of interests for the node.

20 Claims, 7 Drawing Sheets

(56) References Cited

OTHER PUBLICATIONS

G. Chockler et al., "Constructing scalable overlay networks for pub/sub with many topics: Problems, algorithms, and evaluation". In 26th ACM Symposium on Principles of Distributed Computing (PODC), 2007.

R. Guerraoui et al., "Gosskip: a gossip-based structured overlay network for efficient content-based filtering". Technical Report IC/2004/95, EPFL, Lausanne, 2004.

H. Liu, V. Ramasubramanian, and E. G. Sirer. "Client behavior and feed characteristics of RSS", a publish subscribe system for web micronews. In Internet Measurement Conference (IMC), Berkeley, California, Oct. 2005.

V. Ramasubramanian et al., "Corona: A high performance publish-subscribe system for the world wide web". In NSDI, 2006.

D. Sandler et al., "Feedtree: Sharing web micronews with peer-to-peer event notification". In International Workshop on Peer-to-Peer Systems (IPTPS), 2005.

S. Zhuang et al., "An architecture for scalable and fault tolerant wide-area data dissemination". In 11th International Workshop Network and Operating System Support for Digital Audio and Video (NOSSDAV), pp. 11-20, Jun. 2001.

Melamed, R. and Keidar, I, "Araneola: A Scalable Reliable Multicast System for Dynamic Environments". IEEE International Symposium on Network Computing and Applications (NCA04), 2004.

Tang et al., "GoCast: Gossip-Enhanced Overlay Multicast for Fast and Dependable Group Communication", Proc. Int'l Conf. Dependable Systems and Networks (DSN-05), 2005.

S. Ratnasamy et al., "A scalable content-addressable network". In Proc. of ACM SIGCOMM, 2001.

A. Rowstron and P. Druschel, "Pastry: Scalable, distributed object location and routing for large-scale peer-to-peer systems". In Proc. of Middleware, 2001.

I. Stoica et al., "Chord: a scalable peer-to-peer lookup protocol for internet applications" IEEE/ACM Trans. Netw., vol. 11, No. 1, pp. 17-32, Feb. 2003.

B. Y. Zhao et al., "Tapestry: A resilient global-scale overlay for service deployment". IEEE JSAC, 22, 2004.

Alan Demers et al., "Epidemic algorithms for replicated database maintenance". In Proc. of the Sixth ACM Symp. on Principles of Distributed Computing, pp. 1-12, Vancouver, British Columbia, Aug. 1987. ACM SIGOPS-SIGACT.

R. van Renesse, Y. Minsky, M. Hayden, "A gossip-style failure-detection service," Proc. IFIP Intl. Conference on Distributed Systems Platforms and Open Distributed Processing, 1998.

P. T. Eugster et al., "Epidemic information dissemination in distributed systems". IEEE Computer, 37(5):60-67, 2004.

Anne-Marie Kermarrec et al., "Gossiping in distributed systems". ACM SIGOPS Operating Systems Review, 41(5), 2007.

FIPS, "Secure Hash Standard", FIPS PUB 180-1, Federal Information Processing Standard Publication, 1995.

R. Rivest, "The MD5 Message-Digest Algorithm", IETF RFC 1321, 1992.

* cited by examiner

DECENTRALIZED DATA CASTING IN AN INTEREST AWARE PEER NETWORK

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to optimizing data casting in an interest aware peer-to-peer network, and more particularly to a hash-based distribution algorithm for disseminating information in such network.

BACKGROUND

In an interest aware communication network, the participating network nodes generally broadcast their interest in a topic by way of publication of their topics of interest to other nodes. In return, other nodes that are interested in a published topic may subscribe to that topic or provide messages related to that topic to a node with a corresponding interest. This communication paradigm is often referred to as publish-subscribe (pub-sub) broadcast or multicast (e.g., data cast) network.

A publisher node is a node that publishes a message about a topic on logical channels associated with identified topics. A subscriber node is a node that is interested in a message published on a certain topic and thus subscribes to the topic and receives messages published on that topic. Publishers and subscribers are not directly linked or associated with each other in this paradigm because they don't need to know the network address of one another. Instead, a topic identifier is associated with each topic and that association is preserved in a centralized system that mediates between the publishers and subscribers.

Such centralized systems rely on the discovery and distribution of topic-group memberships for each node in the network. A topic-group membership refers to a group of nodes that subscribe to a certain topic. Some systems may have thousands of nodes, thousands of topics and thousands of messages generated on those topics by said nodes. In such large systems, a great multitude of different topics are used for pub-sub communication, system monitoring and control, as well as other processes.

Each pub-sub process may be interested in a different subset of the available topics. Because publishing or subscribing to a topic indicates "interest" in that topic, a service that delivers the identity of subscribers (or publishers, or both) to a topic is called an interest-aware membership service. The interest aware membership service provides to the application using it the interest of nodes in the system. The interest, when presented to the application, may be represented as a set of topic names.

In some implementations, a membership service may represent the interest of a node as a list of string identifiers. This can be highly inefficient, however, where topic names are generally expressed as strings that can be quite lengthy. It is not uncommon, for example, that a topic name is a few hundred characters long. Especially in a decentralized datacenter the large number of nodes and topics, combined with long topic names consume excessive communication bandwidth and memory. That is, a substantial amount of overhead is generated each time the topic names for thousands of nodes are interchanged, and particularly when a new topic is generated or when the interest of a node in a topic changes.

To remedy the above, a central directory service (i.e., registry) may be utilized to track the topic names and provide an index for each topic name where the index is used to associate the numerous topic names with thousands of nodes with an interest in said topic. Interest aware dissemination algorithms may be implemented using topic indices, and inverse lookup tables into the registry in order to link a topic index to a topic name A central registry is generally risky in case of a disaster (i.e., data recovery from a single point of failure is highly undesirable) and also poses the possibility of a performance bottleneck. Moreover, a centralized registry typically needs ongoing configuration and maintenance, thus generating additional administrative overhead.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, a data casting method in an interest aware peer network comprising a plurality of nodes is provided. The method comprises determining whether a set of interests associated with a node in the network is updated, wherein the set of interests comprises one or more topics IDs, wherein each topic ID corresponds to a topic of interest associated with said node; distributing the set of interests associated with the node to one or more neighboring nodes by way of a first distribution scheme until N nodes in the network are aware of the updated set of interests for the node; providing each node in the network with a mechanism to determine value of a topic of interest in a set of interests received in association with a node based on a topic ID included in the set of interests for the node; and wherein a node in the network subscribes or publishes to a topic of interest associated with said node based on the topics of interest associated with the node.

The first distribution scheme may be implemented based on a gossip algorithm. In one embodiment, a hash function (e.g., a distributed hash table) is used to derive the topic ID from the topic of interest. A cache or other type of storage medium including a global set of topics of interest may be updated each time a new topic of interest is generated by a node in the network, and wherein the global set of topics of interest is distributed to the N nodes in the network by way of a second distribution algorithm. The distribution algorithms may be implemented based on a gossip algorithm.

Depending on implementation, the gossip algorithm comprises a method of distribution among neighboring nodes in a network, wherein each node distributes certain information to its neighbor nodes until the N nodes in the network have received said certain information. In one example, X nodes in the network may distribute certain information to a random selection of Y nodes in the network, and said Y nodes which are randomly selected repeat the same distribution method until the N nodes in the network have received said certain information.

In another example, each node in the network distributes certain information to its neighbor nodes until the N nodes in the network have received said certain information. Optionally, a gossip algorithm may distribute information among X nodes in a network, wherein each of the X nodes distributes certain information to a random selection of Y nodes in the network, and said Y nodes which are randomly selected repeat the same distribution method until the N nodes in the network have received said certain information.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
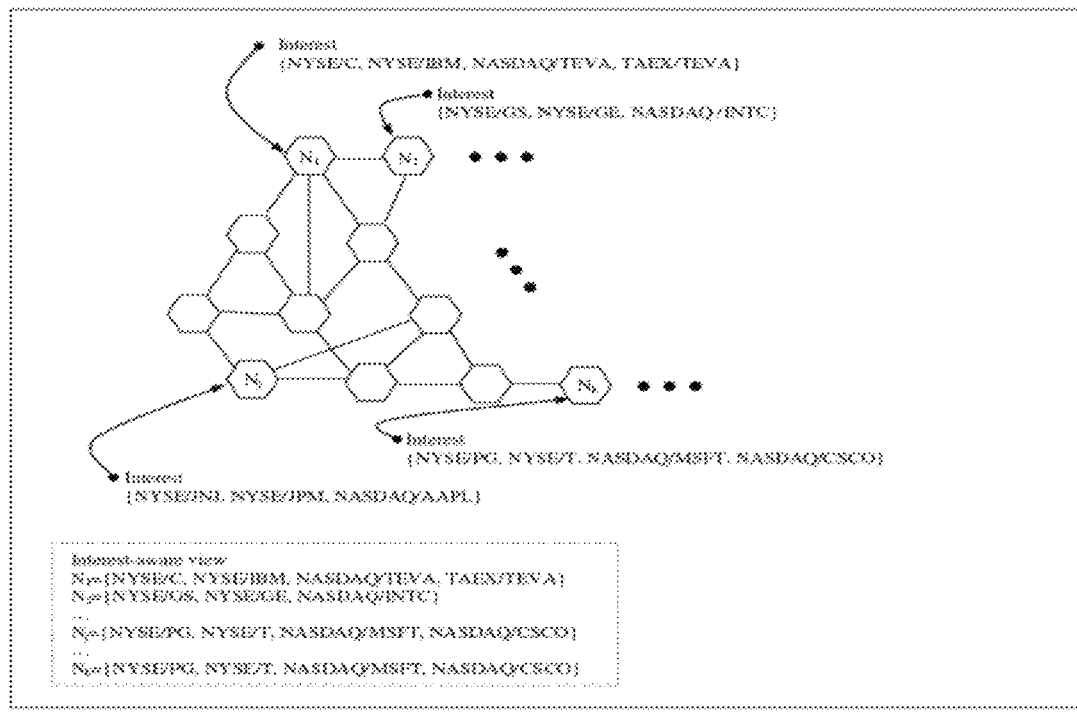
FIG. 1 illustrates an exemplary computing network environment in accordance with one or more embodiments implemented to support an interest aware peer-to-peer data cast mechanism.

Referring to FIG. 1, a distributed system with N nodes (i.e., processes) is illustrated, in accordance with one embodiment. Each node is logically connected to a set of other nodes (i.e., neighbor nodes) in, for example, an overlay network. In one exemplary implementation, a connectivity graph imposed by the overlay network may be partially or optionally fully connected such that a path composed of one or more overlay connections is established from every node to every other node. The overlay network may be an unstructured, structured, or a hybrid overly network.

A topic of interest (TOI) may be expressed as character strings. A node may become a subscriber, or a publisher, or both, on any given topic. A node is said to be interested in a topic if it is a subscriber or publisher to that topic. Such pub-sub environment may be utilized to form an interest-aware network environment in one or more embodiments. An interest-aware implementation maintains the identity of each node together with the set of topics that node is interested in.

The interest may be defined as the set of topics to which a node subscribes. For example, a topic of interest may be represented by a character string that identifies a ticker for a company on the stock market. As shown in FIG. 1, for example, node N1 has subscribed to topics of interest defined by character strings NYSE/C, NYSE/IBM, NASDAQ/TEVA, etc. Depending on implementation, a node may drop or add (i.e., unsubscribe or subscribe, respectively) a TOI from the set of topics associated with the node.

Using the above implementation, the nodes are able to share or data cast information with the other nodes in the network. The information may be shared in a peer-to-peer type overlay network using TCP/IP protocol, for example. This overlay system may be optionally used to implement broadcast and multicast on the overlay network, instead of using IP-multicast protocol, for example. A node may designate one or more TOIs and notify its peers of the TOIs, as provided in further detail below.

The one or more TOIs for a node may be included in a set (e.g., set of interest or (SOI)). The SOI may be disseminated to other nodes in the network so that the other nodes may learn about that nodes interest in one or more TOIs. In one example embodiment, a distribution algorithm is utilized to distribute the topic information (e.g., the TOIs or the SOI) for a node among its peer nodes. Based on the distribution algorithm, each peer node then redistributes the topic information to its peers and so on, until desirably all the nodes in the network are aware of the TOI's of the target node.

Since a TOI is generally represented by a string of characters (e.g., text), distribution of the topic information as strings of characters may not be efficient depending on the size of the network. That is, a substantially large volume of bytes associated with the character strings will be communicated if the TOIs or SOIs of all the nodes in a large network are to be distributed using the distribution algorithm. Thus, in one embodiment, instead of implementing the SOI based on character string TOIs, a compressed version of the TOIs is utilized.

In other words, each TOI is compressed into a topic id (TID), for example, and the TIDs are grouped to implement an SOI for a corresponding node. In this manner, an SOI for a node may be represented by a substantially smaller number of bytes and help reduce the associated overhead with disseminating the topic information for a node by way of the distribution algorithm. As provided in more detail below, a TID may be generated by way of a one-way hash function or a reversible compression scheme depending on implementation.

Figure 2A:
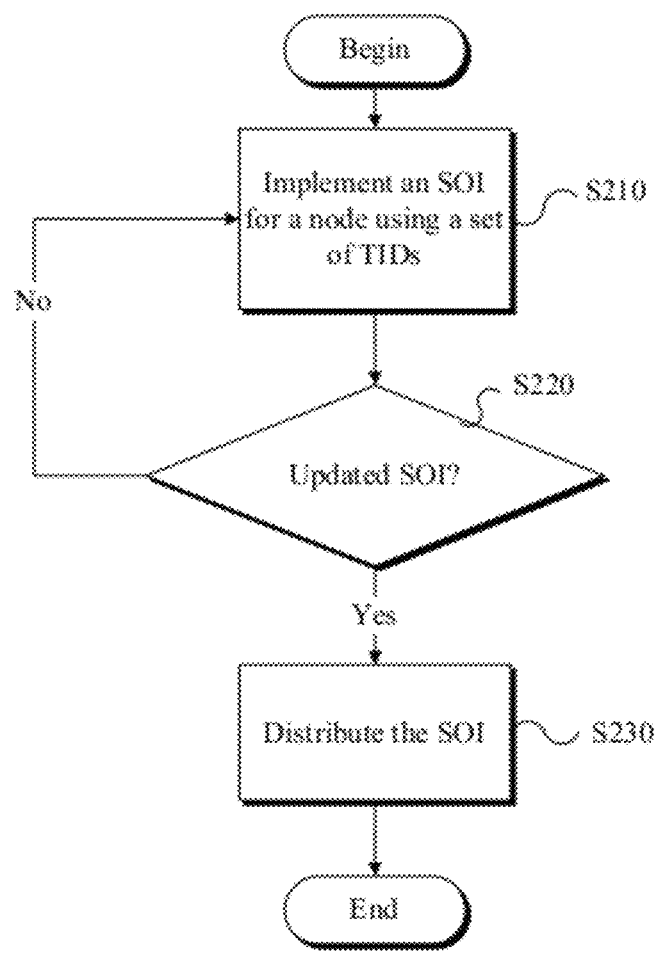
FIGS. 2A and 2B are exemplary block flow diagrams of methods of distributing and tracking interests in data topics, in accordance with one embodiment.

Referring to FIG. 2A, when a node generates a TID for a new TOI, the node desirably implements an SOI or an updated SOI for that node using the new TID (S210). That is, for example, if the SOI associated with the node includes TID1, TID2 and TID3, associated with TOI1, TOI2 and TOI3 respectively, then a new TID4 generated for a new TOI4 for that node is added to the SOI for the node. Thus, the updated SOI includes TID1, TID2, TID3, and TID4. Once it is determined that the SOI is updated, the updated SOI is then distributed to the node's peers and neighbors by way of a distribution algorithm, for example (S220, S230).

Figure 2B:
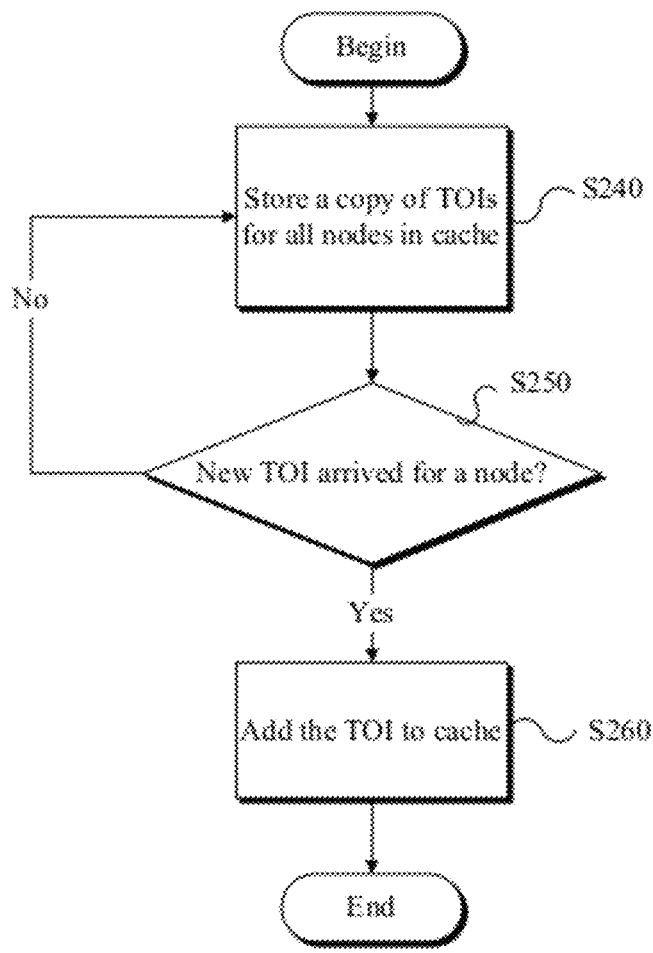

Referring to FIG. 2B, in one implementation, a node stores in a cache area (e.g., a localized storage medium) a copy of TOIs for all nodes (S240). As such, when a new TOI is generated by a node, the node distributes the new TOI to the other nodes in the network. Once the new TOI arrives at the peer nodes (S250), the receiving node adds the new TOI to its cache where the TOIs for other nodes are stored (S260). Different approaches and schemes may be utilized to accomplish the above dissemination scheme.

For example, in one embodiment, the list of one or more TOIs (or alternatively the list of all TOIs) for a node may be disseminated via the distribution algorithm to other nodes, so that the other nodes know that a new TOI has been generated. Optionally, each node includes a global (i.e., network-wide) list of all TOIs. Since, a new TOI is not generated as often as messages that relate to a TOI, distributing a global list of TOIs among the nodes will not create substantial overhead. In some implementations, instead of distributing the global list, the newly generated TOI is distributed to the peer nodes using a distribution algorithm.

Once the other nodes know about the new TOI, they will be able to derive the TID for that TOI by applying a predetermined hash algorithm to the TOI. That is, in one implementation, all nodes use the same hash algorithm so they will arrive at the same TID, if they run it on the same TOI. Thus, each node in its cache or other storage area may implement a lookup table that allows the node to match a newly received TID with a TOI in the global list of TOIs.

In one embodiment, instead of using a hash value, a reversible compression algorithm may be utilized to determine the TOI for a newly received TID. In this manner, there may be no need for generating and distributing a global list of TOIs every time a new TOI or TID is generated by a node. As such, once a node receives an unknown TID that is generated from applying a compression algorithm to a TOI, the node may apply the reverse compression algorithm to the TID to determine the TOI associated with that TID.

A distributed hash algorithm may be utilized to match a TID to a TOI using shortened hash values. In such an implementation, a distributed hash table (DHT) is used to provide a lookup service using (key, value) pairs stored in the DHT. As provided in further detail below, using the DHT values, a node can efficiently retrieve the value (e.g., TOI) associated with a given key (e.g., TID). Responsibility for maintaining the mapping from keys to values is distributed among the nodes in such a way that a change in the set of participants causes a minimal amount of disruption. This allows DHTs to scale to extremely large numbers of nodes and to handle continual node arrivals, departures, and failures.

A distributed hash function helps further reduce the overhead on the pub-sub network by generating even smaller TIDs. It is noteworthy that the generated shortened hash values have a higher chance of collision (i.e., the same shortened TID may represent more than one TOI). As noted briefly above and as it will be discussed in further detail below, the task of resolving the collision may be distributed among the nodes in the network, such that if there are N nodes in the network and a total of M TOIs are assigned, each node is assigned approximately M/N TOIs to handle, for collision purposes.

Accordingly, one or more embodiments may be implemented based on the following schemes: a compact representation for topic names using a hash function; a distribution based interest-aware membership algorithm that uses a compact topic representation; a distributed algorithm that maintains for each node a list of all topic names with their hash values. That is, topic names may be encoded with either a fixed or variable-length identifier generate by a hash function.

In one embodiment, a secure hash function which results in fixed length identifiers (e.g., 160 or 128 bit long) may be used. Because of the cryptographic nature of such hash functions, generation of the same hash value for different topic names will be extremely unlikely. In case a shorter representation is needed, a variable size unique identifier using a DHT may be used. A node may be dedicated in the DHT for each topic, and topic identifier creation may be serialized through that node.

A global inverse map for topic names may be provided such that a node holds a map of known topic names, along with their identifiers. Periodically or upon changes to the self-interest, a node compares the content of its map to the content of its overlay neighbor's maps. If there is a difference, the nodes may exchange maps and set a new map to the union of their respective older maps. A node may continue to compare maps with its neighbors until its map is identical to the maps of its neighbors. This process is implemented so that the nodes eventually learn about the newly generated topics (i.e., TOIs) and the respective identifiers (i.e., TIDs).

In one embodiment, an interest-aware membership distribution algorithm represents the interest of each node based on the SOI for that node and a rumor (i.e., message) in the distribution algorithm is composed of the node ID and its interest. Rumors are spread either (1) to the neighbors of the node in an overlay network, or (2) to a random selection of peers out of the entire network, for example, depending on the type of distribution algorithm used. The end result is that the interest-aware membership algorithm delivers to every node, the interest of every other node in the system, expressed as a list of identifier values (e.g., TOIs or SOIs).

The distribution algorithm is optionally fully distributed and thus avoids the disadvantages of a central registry scheme (i.e., single point of failure, performance bottlenecks, administration overhead, and non-symmetric design). In some embodiments, two distribution layers are implemented. One layer maintains a consistent topic cache 320 that holds the topic names and the corresponding identifiers. The second layer implements interest-aware membership using topic identifiers. This makes the proposed algorithm very robust.

In some embodiments, the interest-aware distribution algorithm operates with topic identifiers and thus conserves bandwidth and memory. For example, consider a system with approximately 100 nodes (i.e., servers) with about 6000 topics, and topic names that are 200 bytes long, on average. Each server may subscribe to about 200 topics on average. Representing the interest of a server in the above example using textual TOI representation scheme takes 200 (topics)*200 (bytes)=40000 bytes.

In contrast, representing the interest of a server in a peer-to-peer interest aware environment noted above, using hash values (e.g., MD5 hash), would take 200 (topics)*(16 bytes) =3200 bytes translating into a 12.5 time reduction in description length. The interest of a node is the basic unit of information that is transferred in a round of the interest-aware distribution algorithm. Thus, the above exemplary distribution algorithms lead to significant reduction in bandwidth usage. In a DHT-based, variable-length topic-identifier creation algorithm, there is a potential for even greater savings in memory and bandwidth. For example, it is possible to represent the topic identifier with about 5 bytes, which may lead to as much as a 40-time reduction in description length and bandwidth.

In addition to the above, some embodiments also provide for shorter message lengths for data messages that are transmitted between the nodes. Multicast or pub-sub data messages that are transmitted on protocols that do not necessitate a two-way handshake between the publisher and subscriber may need to include a topic identifier in every data message. In the following, a more detailed description is provided on how the topic names may be represented in a compact manner by way of encoding the topic names with either a fixed- or variable-length identifier generate by a hash function.

Figure 3A:
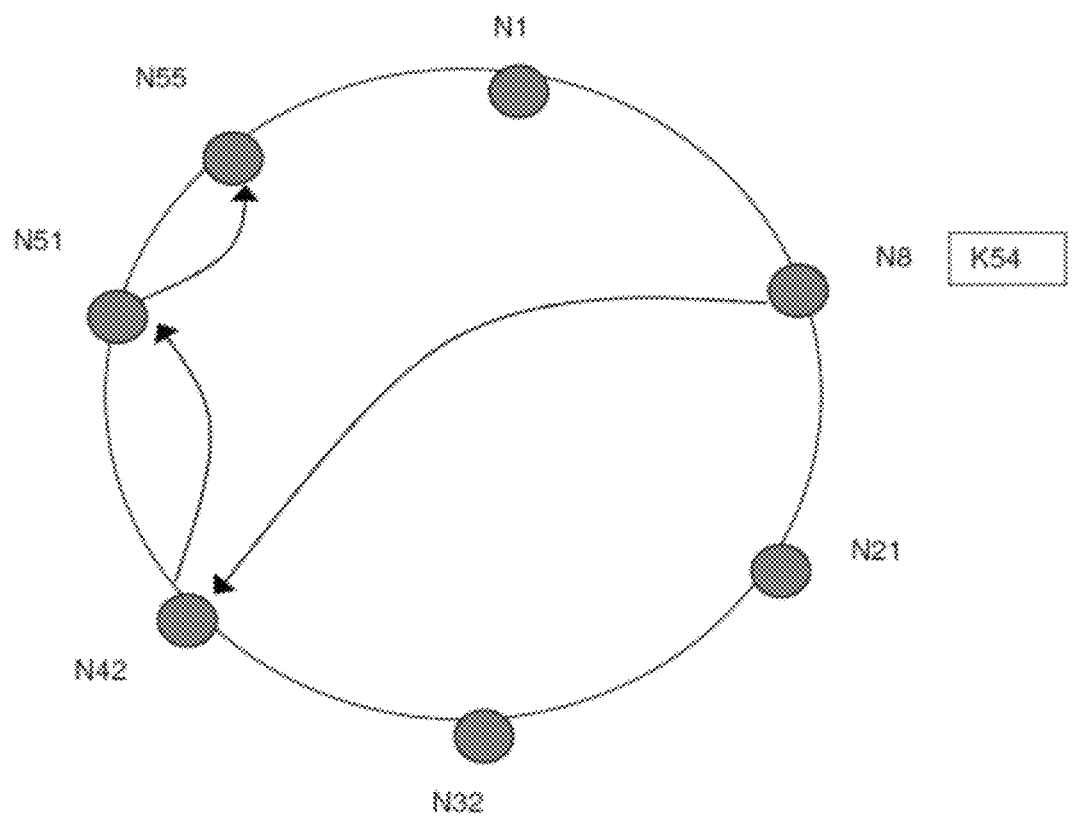
FIGS. 3A and 3B illustrate exemplary models for utilizing a hash-based distribution algorithm to data cast in an interest aware peer network, in accordance with one embodiment.
Figure 3B:
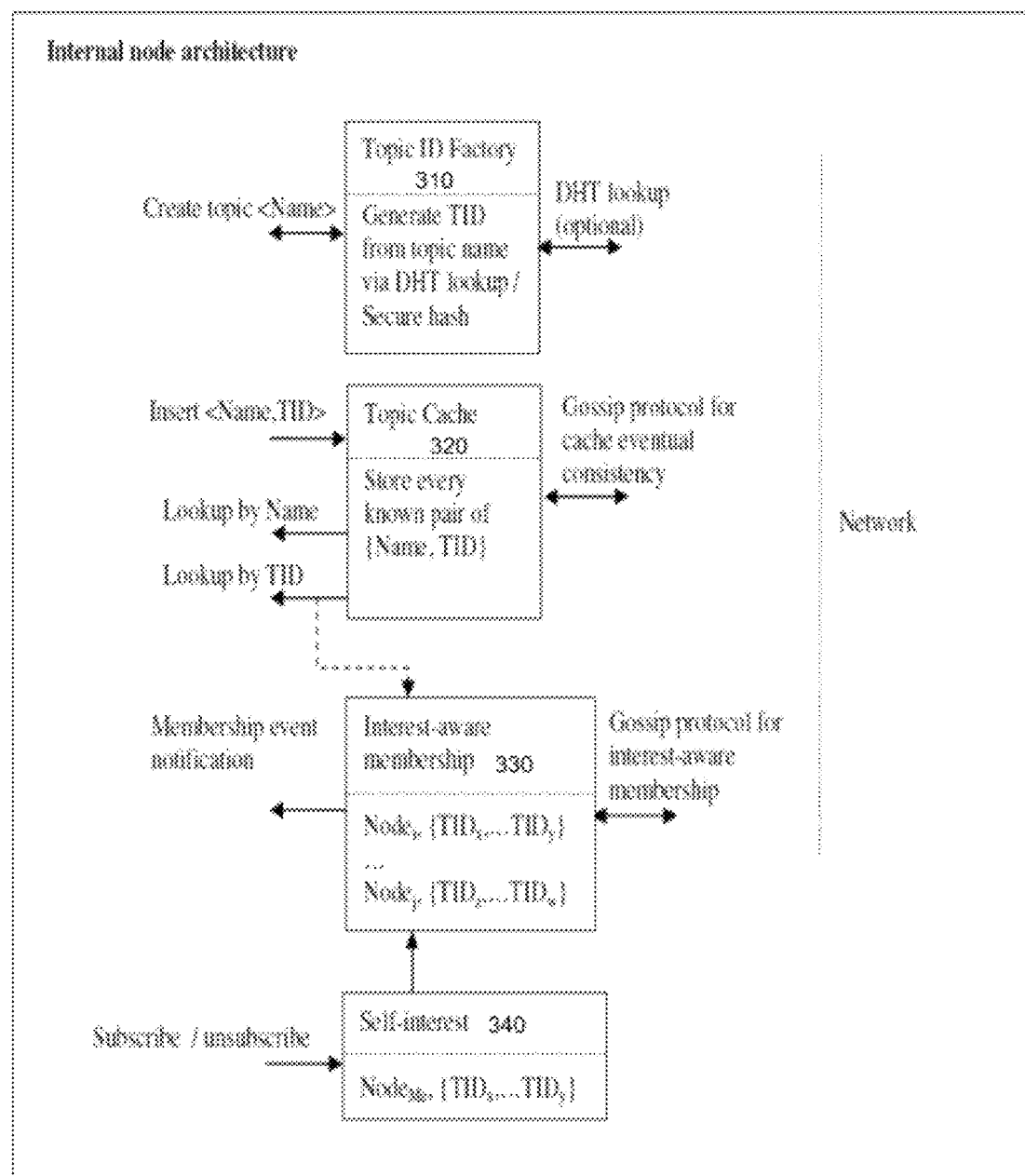

Referring to FIG. 3B and for the sake of example, we assume that there is an operation that takes as input the topic name and produces the compact representation (e.g., "TopicID←createTopic(String topicName)." Such process may be encapsulated in a topic ID generator module (e.g., topic ID factory 310). In some embodiments, fixed length encoding is implemented using a secure hash function, such as SHA1 or MD5, which results in fixed-length identifiers of 160 or 128 bit long, respectively.

Due to the cryptographic nature of these hash functions, generation of the same hash value for different topic names is extremely unlikely to the extent that such functions are also called collision-free hash functions. In other embodiments, variable-length encoding is produced by generating a short fixed-length identifier, and using a DHT lookup in order to extend this identifier with a variable number of bytes, in a manner that ensures uniqueness.

For example, referring to Table 1, L bits may be assigned to a short hash value (SHV), and K bits may be assigned to encode the length (in bytes) of the extension bytes (EL). The variable length encoding length is then (K+L) bits plus (2^K−1) bytes. Normally (K+L) is chosen to be an integer number of bytes.

TABLE 1

Example variable length encoding format

| Extension Length, in bytes (EL) | Short, fixed length Hash Value of topic name (SHV) | Extension bytes, from zero up to 2^K − 1 bytes (EXT) |
|---|---|---|
| K bits | L bits | M bytes |

A DHT implementation may route a <key,message> pair to a single target node, which is a function of the key. A target node that is in charge of a key consistently replicates its state to its successor, so that in case of a failure, one of its successors takes over the role of being in charge of that key, in accordance with one or more embodiments. In one structured overlay implementation nodes may be ordered in a ring according to a virtual ID derived from their name or physical address using an m-bit secure hash function (typically m is between 128 and 160 bits).

When routing a <key,message> pair to a target node, a virtual ID may be generated from the key using the same hash function it used to generate the virtual IDs on the nodes. The node in the ring that will be in charge of handling the <key, message> pair (i.e., the target node) may be the node that has, for example, the lowest virtual ID that is larger than or equal to the virtual ID generated from the key (see FIG. 3A). The link choice in the above-discussed structured overlay and most other structured overlay DHTs allow for a message to be routed to its target in O(Log(N)) hops, when N represents the number of nodes.

FIG. 3A illustrates an exemplary network with exemplary nodes N1, N8, N21, N32, N42, N51, N55 and provides an implementation for routing a message with a key virtual ID=54, from Node N8. The target node for key K54 is node N55, which has the lowest virtual ID that is larger than or equal to 54. Note that the target node for a key with virtual ID=56 will be N1, in this example. Each node contains a cache of known topics and their identifiers, which is update using the distribution protocol. The node that creates a topic first checks whether it is in the cache. If it is not, then the following process takes place in the topic ID factory 310 (see FIG. 3B).

In one embodiment, the node that creates a topic locally calculates the short hash value (SHV), using a system-wide known function. The creating node then uses the SHV as the key for routing a message to a certain target node in the DHT. The message includes a directive to create a topic, the creator node identity, and the topic name, for example. The target node in the DHT that receives the message stores, for each SHV, a set that includes all the unique topic names it ever received with the same SHV, in the order in which they were first received (see Table 2).

The extension encodes the arrival order of the create topic directive for topics with identical SHV, starting from zero. The extension encodes the arrival order as an unsigned binary with the minimal number of bytes. That is, zero is encoded in zero bytes (no extension), values 1-255 are encoded in one byte, and values 256-65535 are encoded in two bytes and so on. The target DHT node returns to the creator node the extensions bytes. The extension is returned using a dedicated message that includes the length of the extension, the extension bytes, and the topic name. The creator node inserts the topic name with the variable length identifier into the topic cache 320. This new entry will be propagated to all other nodes by a distribution service.

In some embodiments, the DHT target node may insert the topic name with the variable length identifier into the topic cache 320. The creator node may wait for the new topic name to be reflected in its own cache. If a target node receives a create request for a topic that already exists, it returns the extension bytes.

TABLE 2

Example data structure in each DHT target node

| SHV | A set of topic names, by arrival order |
|---|---|
| shv-1 | Topic-A, Topic-B, . . . |
| shv-2 | Topic-C |
| . . . | . . . |

For example, let us choose K=4, L=28. A 28-bit hash code may be generated from any character string by taking a 32-bit string hash-code and dropping 4 bits from it (e.g., the upper four). As such, in most cases, the variable length identifier will have a length of 32-bits. In the rare event that two or more topic names have the same 28-bit SHV, an extension may need to be added.

Depending on implementation, when two nodes try to create the same topic at the same time, the create requests will race towards the target node. The request received by the target node first will generate the extension bytes, the second will get the already created value, in one or more example embodiments. The target node that is in charge of a certain key replicates its data-structure among S (configurable) of its successors.

The replication may be consistent, using a mechanism like two-phase-commit, for example. Moreover, the target-node of a topic may be agreed upon among the S+1 nodes that participate in storing the data structures of that topic. This ensures that the data structures in the DHT target nodes remain consistent in the face of node failure. The variable-length identifier is, in an exemplary implementation, shorter than the (secure hash) fixed-length identifier. However, its generation is more expensive and requires a DHT with consistently replicated nodes.

In some implementations, a global inverse map for topic names is provided. Every node holds a map of known topic names, along with their identifiers. This map may be called the topic-cache (see FIG. 3B) The topic-cache supports lookup by topic-name or Topic-ID (TID), or insert of a pair {Topic-name, TID}. A distributed cache consistency protocol that runs between the nodes allows the caches to remain in synch. Two examples of a consistency protocol are provided below.

In one or more embodiments, an anti-entropy scheme on the overlay is provided. Periodically or upon the creation of a new topic, a node compares the content of its topic-cache with the content of its overlay neighbor's topic-cache. If there is a difference, the two nodes exchange maps and set their new map to the union of their respective older maps. A node will continue to compare maps with its neighbors until its map is synchronized with the maps of its neighbors. This process allows the nodes to know the topics and the topic identifiers, as the nodes continue to synchronize their global topic set with other nodes.

The synchronization process may be made more efficient if the map comparison is based on the exchange of cryptographic signatures rather than exchange of the complete map. When a node inserts a new pair {Topic-name,TID} into its cache, it may start a rumor to indicate that said pair has been added and send it to a random selection of peers (not necessarily neighbors). Peers that receive the rumor insert the pair to their cache and distribute it further. This effectively amounts to broadcasting the event to all the participants of the overlay. This process is complemented by a periodic but infrequent anti-entropy phase (e.g., pair-wise comparisons and swap of maps).

Both of the above example embodiments are variants of a distribution-style algorithm. The end result is that the topic-names and their respective Topic IDs are known to the participant nodes in the overlay. In one embodiment, if a message arrives with a topic ID that does not appear in the cache, the message is either retained until an update to the cache arrives or dropped. End-to-end reliability mechanisms may be used to track the delivery of lost messages.

In some embodiments, the interest-aware membership distribution algorithm represents internally the self-interest 340 of each node using a list of identifier values (TID) rather than a list of strings. A rumor (message) in the distribution algorithm is composed of the node ID and its interest (or changes in his interest), together with a logical time-stamp. Rumors are spread either (1) to the neighbors of the node in an overlay network, or (2) to a random selection of peers out of the entire network, depending on the variant of distribution used.

Desirably, when an interest aware membership service 330 delivers an event to the application, it translates the interest representation from TIDs to topic names using the topic cache 320 (see FIG. 3B). If the translation from TID to topic-name fails for a certain TID, which may happen when the translation is not yet in the cache, the interest-aware membership may delay delivery of the event until the cache gets updated with the translation (e.g., from the topic-cache distribution protocol). Accordingly, the interest-aware membership algorithm delivers to a node, the interest of other nodes in the system, expressed as a list of identifier values, for example.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
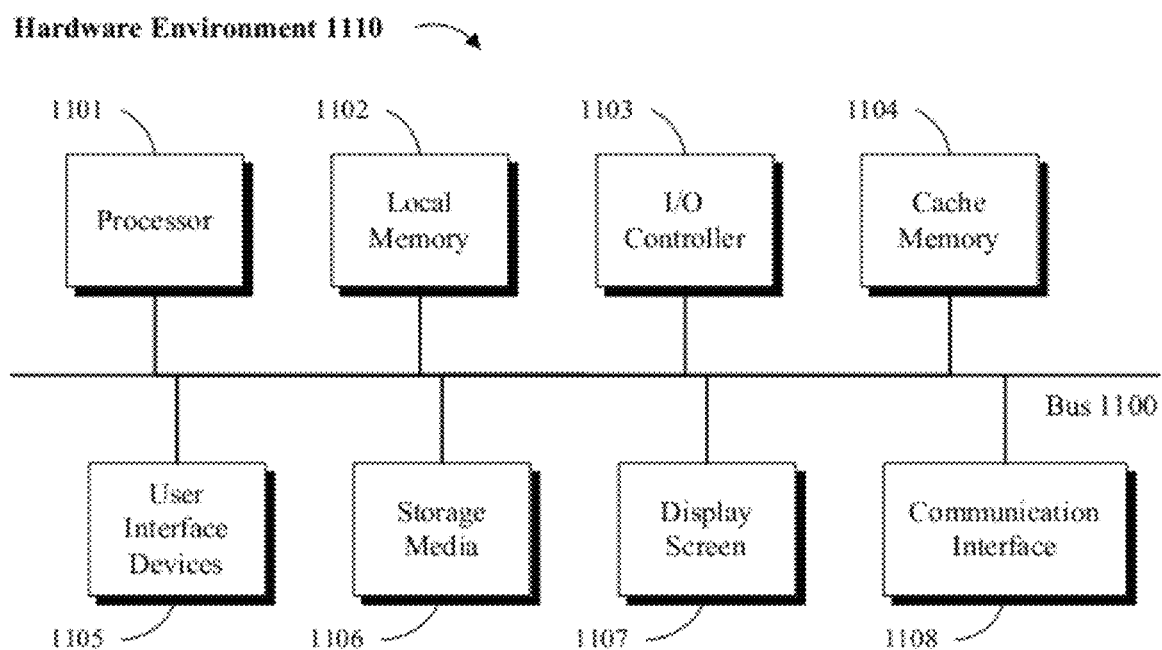
FIGS. 4A and 4B are block diagrams of hardware and software environments in which the disclosed systems and methods may operate, in accordance with one or more embodiments.
Figure 4B:
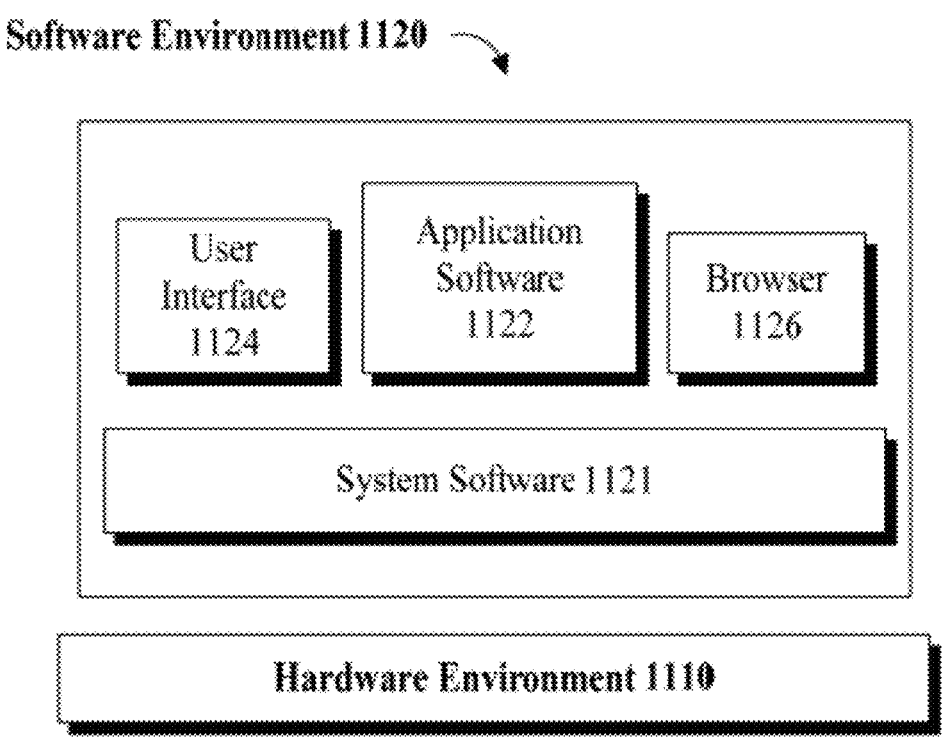

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of computer readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other computer-usable or computer readable media. Within the context of this disclosure, a computer usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a computer-usable or computer readable storage medium that provides program code for use by, or in connection with, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A data casting method in an interest aware peer network comprising a plurality of nodes, the method comprising:
    determining whether a set of interests associated with a node in the network is updated, wherein the set of interests comprises one or more topic IDs, wherein a topic ID corresponds to a topic of interest associated with said node,
    wherein a first topic ID identifies a first channel of communication over which first content associated with the first topic ID is communicated to a first node, and
    wherein a first set of interests identifies one or more subscribers interested in receiving the first content via the first node, and
    wherein an updated set of interests associated with the first node identifies an updated group of subscribers interested in receiving the first content;
    distributing the updated set of interests associated with the first node to one or more neighboring nodes by way of a first distribution scheme, until the total number of the nodes of the network or a subset thereof in the network are aware of the updated set of interests for the first node, wherein the first distribution scheme is implemented based on a gossip algorithm, wherein the gossip algorithm comprises a method of distribution of information among one or more first nodes in a network, wherein each of the one or more first nodes distributes information to a random selection of one or more nodes among a plurality of neighboring nodes in the network, and said one or more neighboring nodes which are randomly selected repeat the same distribution method at least once until the total number of the nodes of the network or a subset thereof in the network have received said information;
    wherein the one or more neighboring nodes determine value of a first topic of interest in the first set of interests received in association with the first node, based on the first topic ID included in the first set of interests for the first node; and
    wherein the first node publishes or subscribes to content corresponding to the first topic of interest associated with the first node.

2. The method of claim 1, wherein a hash function is used to derive a topic ID from a topic of interest.

3. The method of claim 2, wherein a distributed hash table is used to derive the topic ID from the topic of interest.

4. The method of claim 1, wherein a global set of topics of interest is updated each time a new topic of interest is generated by a node in the network, and wherein the global set of topics of interest is distributed to the Total number of the nodes of the network or a subset thereof in the network by way of a second distribution algorithm.

5. The method of claim 4, wherein the second distribution algorithm is implemented based on a gossip algorithm.

6. The method of claim 1, wherein the gossip algorithm comprises a method of distribution among neighboring nodes in a network, wherein each node distributes certain information to its neighbor nodes until the Total number of the nodes of the network or a subset thereof in the network have received said certain information.

7. The method of claim 5, wherein the gossip algorithm comprises a method of distribution among neighboring nodes in a network, wherein each node distributes certain information to its neighbor nodes until the Total number of the nodes of the network or a subset thereof in the network have received said certain information.

8. The method of claim 5, wherein a gossip algorithm comprises a method of distribution of information among one or more first nodes in a network, wherein each of the one or more first nodes distributes certain information to a random selection of one or more neighboring nodes in the network, and said one or more neighboring nodes which are randomly selected repeat the same distribution method until the Total number of the nodes of the network or a subset thereof in the network have received said certain information.

9. A data casting system in an interest aware peer network comprising a plurality of nodes, the system comprising:
   a logic unit for determining whether a set of interests associated with a node in the network is updated, wherein the set of interests comprises one or more topic IDs, wherein a topic ID corresponds to a topic of interest associated with said node;
   wherein a first topic ID identifies a first channel of communication over which first content associated with the first topic ID is communicated to a first node, and
   wherein a first set of interests identifies one or more subscribers interested in receiving the first content via the first node, and
   wherein an updated set of interests associated with the first node identifies an updated group of subscribers interested in receiving the first content;
   a logic unit for distributing the updated set of interests associated with the node to one or more neighboring nodes by way of a first distribution until the total number of the nodes of the network or a subset thereof in the network are aware of the updated set of interests for the first node, wherein the first distribution scheme is implemented based on a gossip algorithm, wherein the gossip algorithm comprises a method of distribution of information among one or more first nodes in a network, wherein each of the one or more first nodes distributes information to a random selection of one or more nodes among a plurality of neighboring nodes in the network, and said one or more neighboring nodes which are randomly selected repeat the same distribution method at least once until the total number of the nodes of the network or a subset thereof in the network have received said information;
   wherein the one or more neighboring nodes determine value of a first topic of interest in the first set of interests received in association with the first node, based on the topic ID included in the first set of interests for the first node; and
   wherein the first node publishes or subscribes to content corresponding to the first topic of interest associated with the first node.

10. The system of claim 9, wherein a hash function is used to derive a topic ID from a topic of interest.

11. The system of claim 10, wherein a distributed hash table is used to derive the topic ID from the topic of interest.

12. The system of claim 9, wherein a global set of topics of interest is updated each time a new topic of interest is generated by a node in the network, and wherein the global set of topics of interest is distributed to the Total number of the nodes of the network or a subset thereof in the network by way of a second distribution algorithm.

13. The system of claim 12, wherein the second distribution algorithm is implemented based on a gossip algorithm.

14. The system of claim 9, wherein the gossip algorithm comprises a method of distribution among neighboring nodes in a network, wherein each node distributes certain information to its neighbor nodes until the Total number of the nodes of the network or a subset thereof in the network have received said certain information.

15. The system of claim 13, wherein the gossip algorithm comprises a method of distribution among neighboring nodes in a network, wherein each node distributes certain information to its neighbor nodes until the Total number of the nodes of the network or a subset thereof in the network have received said certain information.

16. The system of claim 13, wherein a gossip algorithm comprises a method of distribution of information among one or more first nodes in a network, wherein each of the one or more first nodes distributes certain information to a random selection of one or more neighboring nodes in the network, and said one or more neighboring nodes which are randomly selected repeat the same distribution method until the Total number of the nodes of the network or a subset thereof in the network have received said certain information.

17. A computer program product comprising a non-transitory data storage medium having a computer readable program, wherein the computer readable program when executed on a computer causes the computer to:
   determine whether a set of interests associated with a node in the network is updated, wherein the set of interests comprises one or more topic IDs, wherein each topic ID corresponds to a topic of interest associated with said node;
   wherein a first topic ID identifies a first channel of communication over which first content associated with the first topic ID is communicated to a first node, and
   wherein a first set of interests identifies one or more subscribers interested in receiving the first content via the first node, and
   wherein an updated set of interests associated with the first node identifies an updated group of subscribers interested in receiving the first content;
   distribute the updated set of interests associated with the node to one or more neighboring nodes by way of a first distribution scheme until the total number of the nodes of the network or a subset thereof in the network are aware of the updated set of interests for the first node, wherein the first distribution scheme is implemented based on a gossip algorithm, wherein the gossip algorithm comprises a method of distribution of information among one or more first nodes in a network, wherein each of the one or more first nodes distributes information to a random selection of one or more nodes among a plurality of neighboring nodes in the network, and said one or more neighboring nodes which are randomly selected repeat the same distribution method at least once until the total number of the nodes of the network or a subset thereof in the network have received said information;
   wherein the one or more neighboring nodes determine value of a first topic of interest in the first set of interests received in association with the first node, based on the topic ID included in the first set of interests for the first node; and
   wherein the first node subscribes or publishes to content corresponding to the first topic of interest associated with the first node.

18. The computer program product of claim 17, wherein a hash function is used to derive a topic ID from a topic of interest.

19. The computer program product of claim 18, wherein a distributed hash table is used to derive the topic ID from the topic of interest.

20. The computer program product of claim 17, wherein a global set of topics of interest is updated each time a new topic of interest is generated by a node in the network, and wherein the global set of topics of interest is distributed to the Total number of the nodes of the network or a subset thereof in the network by way of a second distribution algorithm.

* * * * *